C. F. ODIN.
WHEEL TIRE.
APPLICATION FILED MAR. 2, 1916.
1,200,755.
Patented Oct. 10, 1916.
2 SHEETS—SHEET 1.
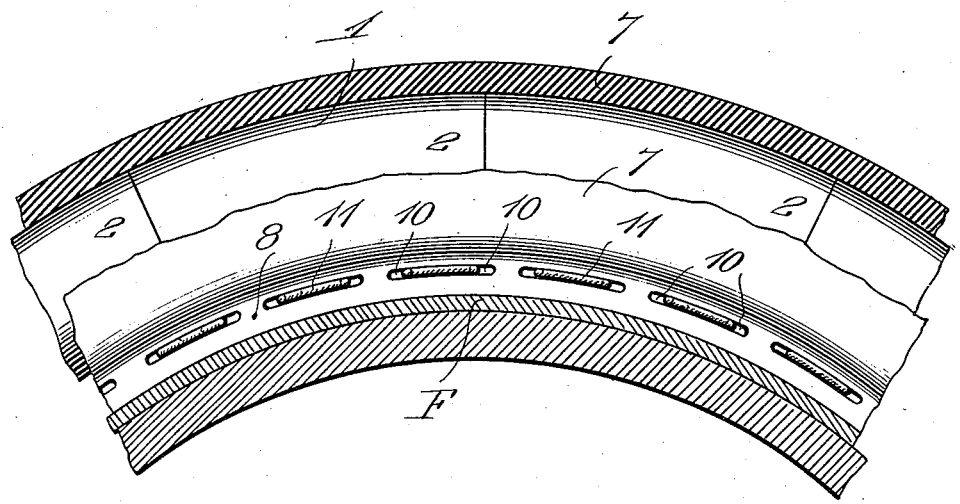
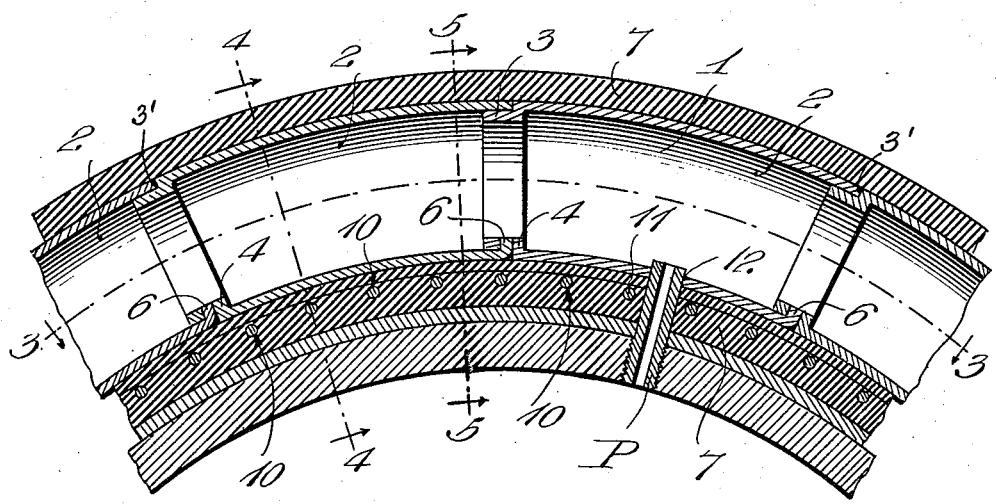
Witness
Inventor
Charles F. Odin
By H. B. Willson &Co.
Attorneys

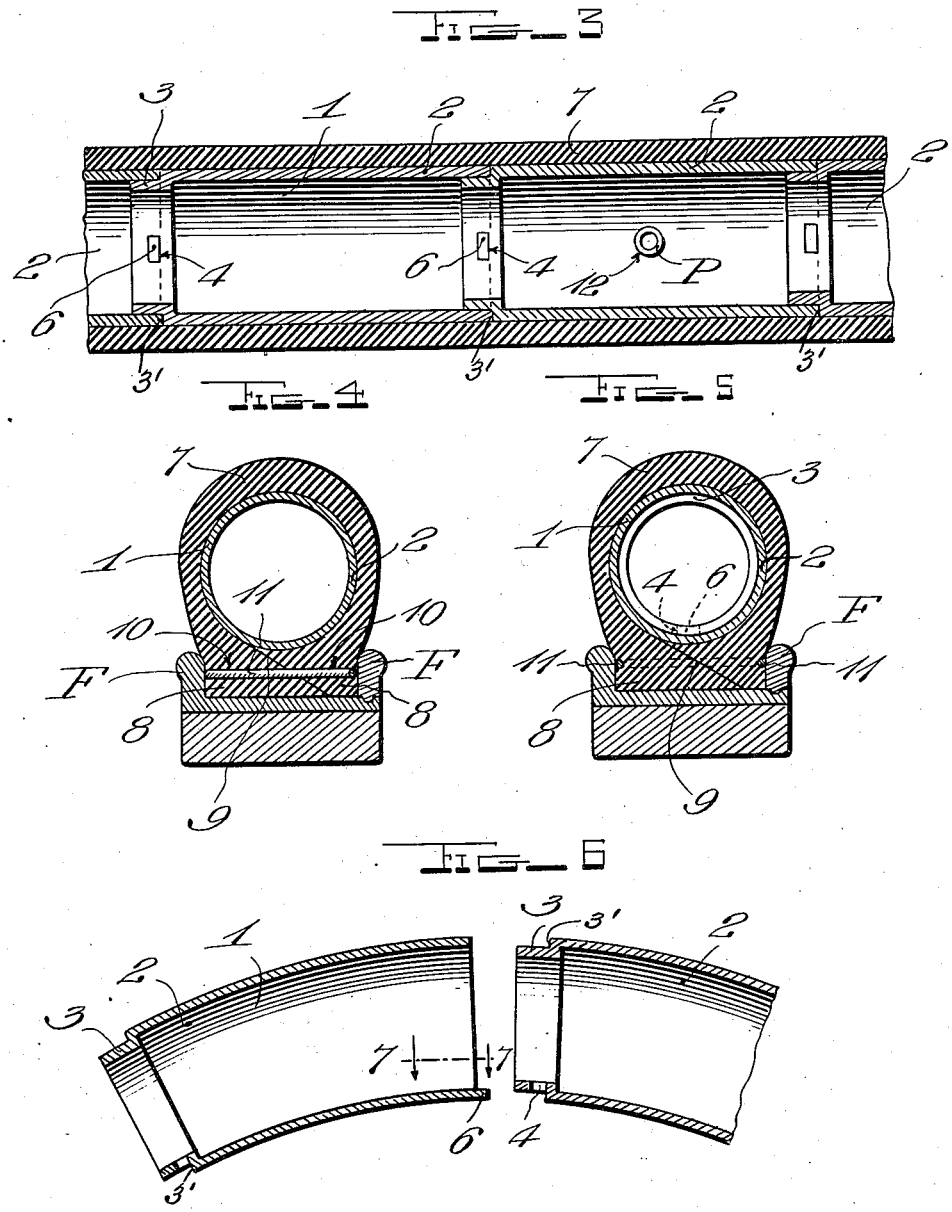
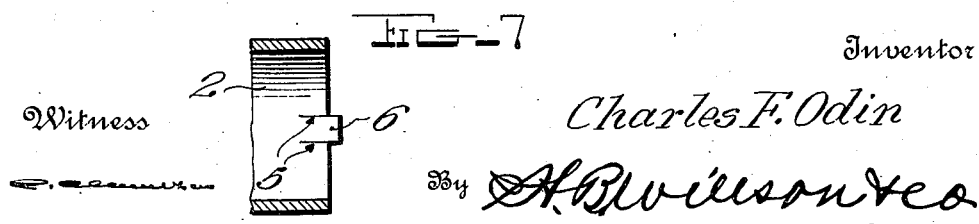

UNITED STATES PATENT OFFICE.

CHARLES F. ODIN, OF ELMIRA, NEW YORK.

WHEEL-TIRE.

1,200,755.  Specification of Letters Patent.  Patented Oct. 10, 1916.

Application filed March 2, 1916. Serial No. 81,733.

*To all whom it may concern:*

Be it known that I, CHARLES F. ODIN, a citizen of the United States, residing at Elmira, in the county of Chemung and State of New York, have invented certain new and useful Improvements in Wheel-Tires; and I do declare the following to be a full, clear, and exact description of the invention, such as will enable others skilled in the art to which it appertains to make and use the same.

This invention is an improvement in wheel tires, and relates more especially to rubber tires of that particular class in which the tire or tube is maintained inflated so as to provide a resilient body and tread, possessing distinct advantages over a solid tire. In the operation of tires of this character, it is customary to maintain them inflated by means of compressed air confined within the outer tube or casing itself, or within a supplemental inner tube; but this form of tire is objectionable to the extent that it is liable to puncture and become deflated, thus destroying its resiliency.

The primary object of the present invention therefore, is to provide a particular form of resilient tire in which the outer tube or casing is maintained in a distended condition by means of a metallic inner tube disposed in such a manner as to give the desired resiliency to the tread without danger of deflation, consequently producing a more durable tire.

Another object of the invention resides in the provision of a tire in which the body or inner tube thereof is constructed from a series of metallic tubular sections fitted one within the other to present a continuous tread surface and enabling the sections to be separated if desired without displacing the others when repairs are to be made.

A further object of the invention is to provide a resilient tire of this character which will be of simple, strong and durable construction, cheap to manufacture, efficient and reliable in operation, and well adapted to the purpose for which it is designed.

With these and other objects in view, the invention consists in the construction, combination and arrangement of parts as will be hereinafter fully described and claimed.

In the accompanying drawings forming part of the specification and in which similar reference characters designate like parts throughout the several views, Figure 1 is a side elevation of a portion of a tire constructed in accordance with this invention, the wheel rim and a portion of the outer casing of the tire being shown in section; Fig. 2 is a central vertical longitudinal sectional view of a portion of the tire; Fig. 3 is substantially a horizontal sectional view of the same taken on the line 3—3 of Fig. 2; Figs. 4 and 5 are transverse sectional views taken on the planes of the lines 4—4 and 5—5 respectively of Fig. 2; Fig. 6 is a central vertical longitudinal section of a pair of attaching metal sections prior to their interlocking engagement; and Fig. 7 is a detail horizontal sectional view taken on the plane of the line 7—7 of Fig. 6.

The accompanying drawings illustrate the preferred form of the present invention, and it is here shown as comprising an inner tube 1 composed of a plurality of relatively short longitudinally curved tubular resilient metallic sections 2. One of the ends of these sections 2 are provided with reduced portions 3, which form, as will be readily understood, shoulders 3', the latter extending entirely around the sections for a purpose to be hereinafter described. Arranged on the inner sides of the reduced portions 3 and having their inner edges disposed in the planes of the shoulders 3', are rectangular slots 4.

The other ends of the sections 2 are provided on their inner sides with circumferentially spaced parallel slits 5, the narrow portions of said sections between the latter being provided at their free ends with inwardly and right angularly extending lugs 6, the outer sides of which are disposed in the planes of the respective ends of the sections.

To assemble the sections, the inwardly bent lugs 6 are engaged with the slots 4, and the reduced portions 3 are sprung into the other ends of the adjacent sections, which operation will be readily understood owing to the fact that said sections are constructed of a resilient material. As clearly shown by Fig. 2 of the drawings, the free ends of the lugs 6 lie flush with the interior sides of the reduced portions 3, whereby the sections may be readily disengaged and separated. When the sections are thus assembled, the ends of the same opposite the reduced portions 3 rest against the shoulders 3' and form a tube having a smooth exterior surface and being of uniform diameter in cross section throughout its entire length. This, as will be readily understood, prevents injury to the outer tube or casing now to be described.

Surrounding the inner tube 1 is an outer tube or casing 7 composed of rubber fiber or any other suitable material. The sides of this outer casing 7 are enlarged as at 8, beveled as at 9, brought together, overlapped diagonally, and provided with transversely alined apertures 10. The outer ends of the apertures 10 are flared circumferentially as more clearly shown in Fig. 1 of the drawings, and extending through the same are suitable elements for securing the sides together, preferably in form of a continuous flexible lacing 11 which is carried back and forth through the alined apertures 10, as shown.

In applying the invention to use, the tubular sections are fitted one within the other and interlocked in the manner hereinbefore described to form the inner tube of the tire, and the outer casing 7 is then laced around the same. The tire is then placed on the wheel of the automobile or other vehicle, the enlarged sides 8 of the outer casing 7 fitting in the usual manner between a pair of flanges F carried by the rim. To prevent creeping or circumferential movement of the tire over the rim, one of the sections 2 is provided with an aperture 12 to receive the inner end of a hollow plug P, the latter allowing air to circulate through the inner tube in addition to its primary function.

It may be seen that a tire constructed in this manner is unpuncturable, owing to the fact that the inner tube is of metal, and furthermore the necessity of pumping is obviated, as the resiliency of the tubular metallic sections 2 maintain the same distended at all times.

From the foregoing description, taken in connection with the accompanying drawings, the advantages and operation of the invention will be readily understood without a more extended explanation. The drawings, however, are merely illustrative of the invention, as various minor changes in form and proportion, and the minor details of construction may be resorted to without departing from the spirit of the invention. Hence I do not wish to be limited to the construction herein shown and described, other than that set forth in the appended claim.

I claim as my invention:

A device of the class described comprising a plurality of relatively short longitudinally curved resilient metallic sections, one of the ends of said sections being provided with reduced portions forming shoulders extending entirely around the same, said reduced portions being provided on their inner sides with slots, the inner edges of which are disposed in the planes of said shoulders, the other ends of said sections being provided on their inner sides with circumferentially spaced parallel slits, lugs extending inwardly at right angles from the free ends of the narrow portions of said sections between said slits and having their outer sides disposed in the planes of the last referred to ends of said sections, said lugs being removably received in said slots and having their free ends lying flush with the interior sides of said reduced portions, whereby said sections are removably locked together so as to provide a tube having a smooth exterior surface and of uniform diameter in cross section throughout its entire length.

In testimony whereof I have hereunto set my hand in presence of two subscribing witnesses.

CHARLES F. ODIN.

Witnesses:
E. M. FAY,
W. H. O'NEIL.